US012675068B2

(12) United States Patent
Moteki et al.

(10) Patent No.: US 12,675,068 B2
(45) Date of Patent: Jul. 7, 2026

(54) FIXING DEVICE AND IMAGE FORMING APPARATUS

(71) Applicant: CANON KABUSHIKI KAISHA, Tokyo (JP)

(72) Inventors: Junichi Moteki, Chiba (JP); Rikiya Takemasa, Chiba (JP); Takuya Hasegawa, Tokyo (JP); Tatsuo Yasui, Tokyo (JP); Kenichi Tanaka, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/742,152

(22) Filed: Jun. 13, 2024

(65) Prior Publication Data

US 2025/0021036 A1 Jan. 16, 2025

(30) Foreign Application Priority Data

Jul. 11, 2023 (JP) ................................ 2023-113599

(51) Int. Cl.
*G03G 15/20* (2006.01)

(52) U.S. Cl.
CPC ..... *G03G 15/2064* (2013.01); *G03G 15/2028* (2013.01); *G03G 15/2032* (2013.01); *G03G 2215/2038* (2013.01)

(58) Field of Classification Search
None
See application file for complete search history.

(56) References Cited

U.S. PATENT DOCUMENTS 9,188,914 B2 11/2015 Takagi et al.
2010/0196064 A1* 8/2010 Burton .............. G03G 15/6573 399/329

(Continued)

FOREIGN PATENT DOCUMENTS

EP 3214502 A1 * 9/2017 ......... G03G 15/2028
JP 2008033033 A * 2/2008
JP 2014202851 A 10/2014

OTHER PUBLICATIONS

Machine translation of Komuro (2008).*

*Primary Examiner* — Sevan A Aydin
(74) *Attorney, Agent, or Firm* — ROSSI, KIMMS & McDOWELL LLP

(57) ABSTRACT

A fixing device is disclosed that has a heating rotating member configured to be rotatable and to heat the unfixed toner image; a pressing rotating member configured to be rotatable and to form a fixing nip portion by coming in contact with the heating rotating member; and a separating member configured to separate the recording material having passed through the fixing nip portion from the heating rotating member, the separating member being provided downstream of the fixing nip portion in a conveying direction of the recording material to be opposed to the heating rotating member with a gap in a non-contact state, wherein the pressing rotating member comes in contact with the heating rotating member to form the fixing nip portion that nips and conveys the recording material with a first pressure or a second pressure that is lower than the first pressure, and wherein the separating member moves more downstream in the conveying direction when the pressure of the fixing nip portion is the second pressure than when the pressure of the fixing nip portion is the first pressure.

8 Claims, 10 Drawing Sheets

(56) References Cited

U.S. PATENT DOCUMENTS

| | | | | |
|---|---|---|---|---|
| 2011/0236069 | A1* | 9/2011 | Arikawa ............ | G03G 15/2028<br>399/329 |
| 2013/0279957 | A1* | 10/2013 | Kasama ............. | G03G 15/2064<br>399/329 |
| 2015/0117920 | A1* | 4/2015 | Moteki .............. | G03G 15/2028<br>399/323 |

* cited by examiner

FIXING DEVICE AND IMAGE FORMING APPARATUS

BACKGROUND OF THE INVENTION

Field of the Invention

This invention relates to a fixing device that fixes an unfixed toner image formed on a recording material to the recording material and an image forming apparatus of electrophotographic system or electrostatic recording system with the fixing device.

Description of the Related Art

In a conventional image forming apparatus of electrophotographic system, an electrostatic latent image formed on a photosensitive drum as an image bearing member is developed with toner in the developing device to form a toner image, the formed toner image is transferred to a sheet, and thereafter the formed toner image is fixed to the sheet in the fixing device. Such a fixing device has a heating rotating member such as a fixing belt and a pressure rotating member such as a pressure roller. Between the heating rotating member and the pressure rotating member, a fixing nip portion is formed and the unfixed toner image is fixed to the recording material by heating and pressuring the sheet at the fixing nip portion.

Further, a conventional fixing device is known in which a separating member of contact type or non-contact type is provided downstream of a heating unit having a heating rotating member and a heater in the sheet conveying direction in order to separate a sheet that adhered to the heating rotating member after the sheet passes though the fixing nip portion.

Generally, such a separating member is required to be highly precisely positioned with respect to the heating rotating member to be attached to the heating rotating member. Japanese Patent Application Laid-Open No. 2014-202851 discloses a fixing device with a separating member that separates a sheet from a fixing roller as a heating rotating member, wherein an abutting member is provided that abuts against the separating member out of the sheet passing region of the fixing roller to guarantee a gap between the fixing roller and the separating member. The fixing device of Japanese Patent Application Laid-Open No. 2014-202851 has the configuration in which the separating member is rotated in the direction in which the separating member is separated from the fixing roller during sleeping mode.

Recently, the fixing device adopts the configuration in which the abutting pressure between the fixing belt and the pressure roller at the fixing nip portion can be changed in order to form a high quality image for various printing media with the diversification of the printing media. For example, the abutting pressure between the fixing belt and the pressure roller during the fixation of an image to an envelop is reduced to about a half of the abutting pressure during the fixation of an image to a normal printing medium in order to suppress the damage to the fixing member due to the wrinkles and the edges of the envelop.

In the above fixing device, according to a change in the abutting pressure between the fixing belt and the pressure roller at the fixing nip portion, the traveling locus of the fixing belt changes, so that the distance between the separating member and the fixing belt also changes. In this case, it is necessary to guarantee a gap between the separating member and the fixing roller by moving the separating member in response to a change in abutting pressure between the fixing belt and the fixing roller at the fixing nip portion.

However, the fixing device of Japanese Patent Application Laid-Open No. 2014-202851 has a problem that with the printing operation continuing, the portion where the abutting member abuts deteriorates, so that an image defect may occur at end portions of the image. Specifically, the surface of the fixing roller is covered with PFA (Perfluoro alkoxy alkane) tube layer as a release layer and a wrinkle or a float occurs, with the printing operation continuing, on the portion of the fixing roller against which the abutting member abuts. When the wrinkle or the float occurred in the PFA tube layer spreads from the sheet non-passing area to the sheet passing area, an image defect may occur at an end portion of the image.

Further, the fixing device of Japanese Patent Application Laid-Open No. 2014-202851 has another problem that the high durability of the fixing roller is not realized because the abutting member that abuts against the fixing roller also wears with the printing operation continuing so that it is difficult to guarantee the gap between the fixing roller and the separating member for a long period of time.

Moreover, in the fixing device of Japanese Patent Application Laid-Open No. 2014-202851, the separating member that rotates in the direction in which the separating member is separated from the fixing belt in the reduced pressure state may enter the region in which the recording material moves that is discharged from the fixing nip portion. As a result, the fixing device of Japanese Patent Application Laid-Open No. 2014-202851 has yet another problem that, when a recording material is discharged from the fixing nip portion in the reduced pressure state, the recording material discharged from the fixing nip portion may be caught by the separating member, so that the recording material cannot be properly discharged.

SUMMARY OF THE INVENTION

The purpose of the present invention is to provide a fixing device and an image forming apparatus that can realize high durability of a fixing belt, prevent various kinds of recording materials from not being discharged, and guarantee a preferred gap between the fixing belt and the separating member.

A fixing device according to the present invention that fixes an unfixed toner image formed on a recording material onto the recording material, comprising:

- a heating rotating member configured to be rotatable and to heat the unfixed toner image;
- a pressing rotating member configured to be rotatable and to form a fixing nip portion by coming in contact with the heating rotating member; and
- a separating member configured to separate the recording material having passed through the fixing nip portion from the heating rotating member, the separating member being provided downstream of the fixing nip portion in a conveying direction of the recording material to be opposed to the heating rotating member with a gap in a non-contact state,
- wherein the pressing rotating member comes in contact with the heating rotating member to form the fixing nip portion that nips and conveys the recording material with a first pressure or a second pressure that is lower than the first pressure, and wherein the separating member moves more downstream in the conveying direction when the pressure of the fixing nip portion is the second pressure than when the pressure of the fixing nip portion is the first pressure.

Further features of the present invention will become apparent from the following description of exemplary embodiments with reference to the attached drawings.

DESCRIPTION OF THE EMBODIMENTS

Hereinafter, with reference to the drawings, embodiments of the present invention will be described in detail.

Configuration of Image Forming Apparatus

Figure 1:
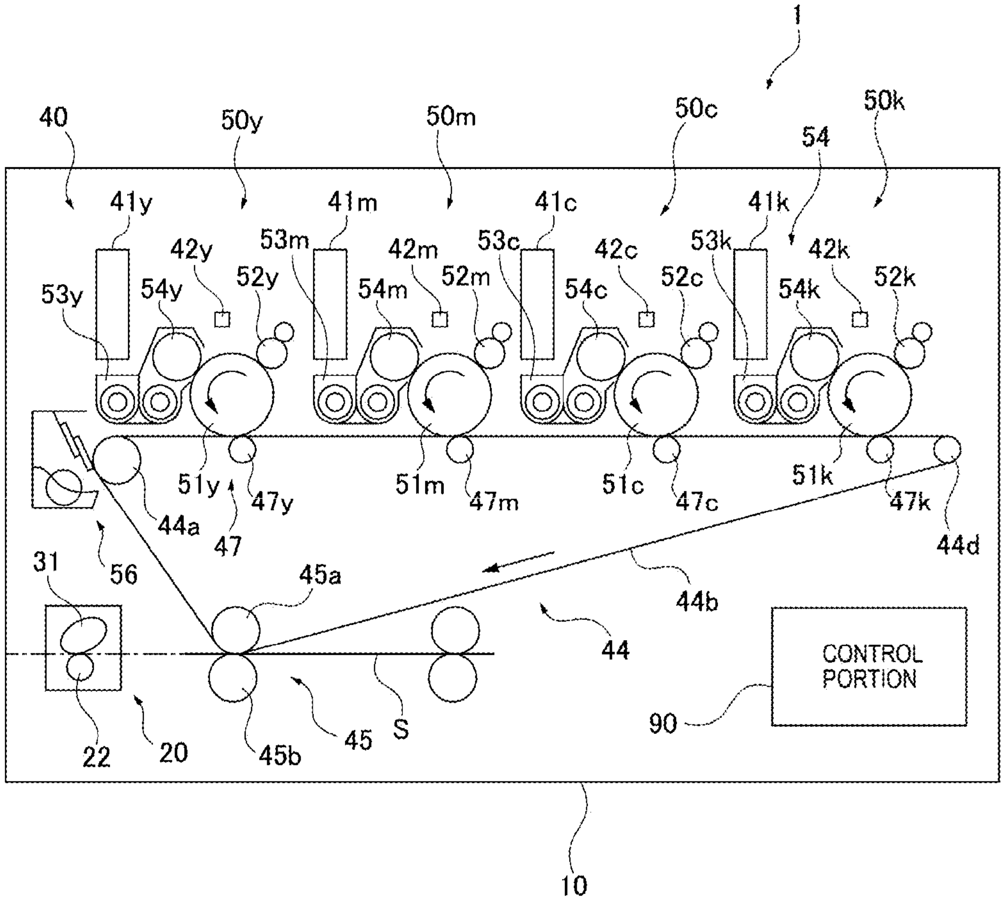
FIG. 1 is a schematic diagram showing the configuration of an image forming apparatus according to an embodiment of the present invention.
Figure 2:
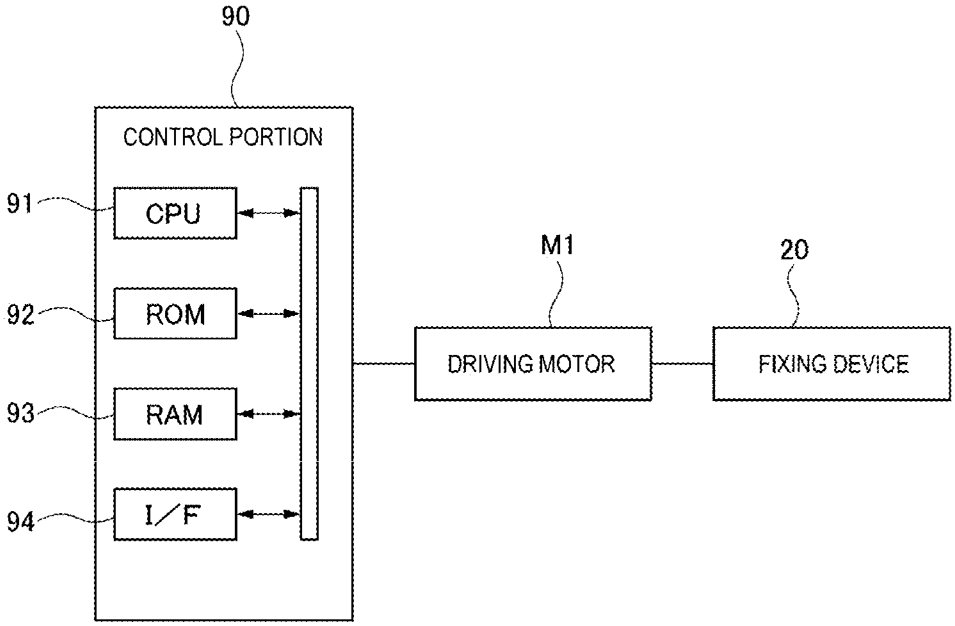
FIG. 2 is a block diagram showing the configuration of an image forming apparatus according to the embodiment of the present invention.

The configuration of the image forming apparatus 1 according to an embodiment of the present invention will be described referring to FIGS. 1 and 2.

The image forming apparatus 1 is exemplified as a full color printer of tandem type. The image forming apparatus 1 is not limited to a full color printer of tandem type, but can be an image forming apparatus of type other than tandem type. Further, the image forming apparatus 1 is not limited to a full color printer, but can be a monochrome or monocolor printer. Furthermore, the image forming apparatus 1 can be used as a printer, a printing device, a copying machine, a facsimile, and a multi-function machine.

The image forming apparatus 1 forms a four full-color image on a recording material S such as a sheet in response to an image signal input from a document reading apparatus, a host device such as a personal computer, or an external device such as a digital camera and a smart phone. The host device and the external device are not shown in the figures. The recording material S is for example a sheet of plain paper, plastics alternative of the plain paper, or thick paper, a sheet for overhead projector, or an envelope.

Specifically, the image forming apparatus 1 has the image forming portion 40, the control portion 90, and the driving motor M1.

The image forming portion 40 forms a toner image on the recording material S fed from an unshown sheet feeding portion in response to an image signal input from a document reading apparatus, a host device, or an external device, neither of which is shown in the figures. In the image forming portion 40, a toner image is fixed to the recording material S by heating and pressuring the recording material S on which a toner image is formed, and then the recording material S to which the toner image is fixed is discharged outside the apparatus main body 10.

The image forming portion 40 has the image forming units 50*y*, 50*m*, 50*c*, and 50*k*, the toner bottles 41*y*, 41*m*, 41*c*, and 41*k*, the exposure devices 42*y*, 42*m*, 42*c*, and 42*k*, the intermediate transfer unit 44, the secondary transfer portion 45, and the fixing device 20. The image forming units 50*y*, 50*m*, 50*c*, and 50*k*, the toner bottles 41*y*, 41*m*, 41*c*, and 41*k*, the exposure devices 42*y*, 42*m*, 42*c*, and 42*k*, the intermediate transfer unit 44, and the secondary transfer portion 45 constitute a toner image forming portion.

In the image forming apparatus 1 adapted to full-color imaging, the image forming units 50*y*, 50*m*, 50*c*, and 50*k* have the same configuration as each other and are provided corresponding to colors yellow (y), magenta (m), cyan (c), and black (k). The toner bottles 41*y*, 41*m*, 41*c*, and 41*k* as well as the exposure devices 42*y*, 42*m*, 42*c*, and 42*k* have the same configuration as each other and are provided corresponding to colors yellow (y), magenta (m), cyan (c), and black (k).

The image forming units 50*y*, 50*m*, 50*c*, and 50*k* form a toner image in response to an image signal input from a document reading apparatus, a host device, or an external device, neither of which is shown in the figures. Each of the image forming units 50*y*, 50*m*, 50*c*, and 50*k* is integrated as a unit of a process cartridge and is detachably attached to the apparatus main body 10 to transfer the toner image to the intermediate transfer belt 44*b* of the intermediate transfer unit 44.

The image forming units 50*y*, 50*m*, 50*c*, and 50*k* respectively have the photosensitive drums 51*y*, 51*m*, 51*c*, and 50*y*, the charging rollers 52*y*, 52*m*, 52*c*, and 52*k*, the developing devices 53*y*, 53*m*, 53*c*, and 53*k*.

The photosensitive drums 51*y*, 51*m*, 51*c*, and 51*k* are, for example, negatively chargeable organic photoconductors (OPC) with an outer diameter of 30 mm. The photosensitive drums 51*y*, 51*m*, 51*c*, and 51*k* are driven to rotate by an unshown motor at a predetermined process speed (circumferential speed) in the direction indicated by an arrow in FIG. 1. The photosensitive drums 51*y*, 51*m*, 51*c*, and 51*k* respectively bear the electrostatic latent image formed by the exposure devices 42*y*, 42*m*. 42*c*, and 42*k* and the toner image formed by the developing devices 53*y*, 53*m*, 53*c*, and 53*k*.

The charging rollers 52*y*, 52*m*, 52*c*, and 52*k* are rubber rollers which are brought into contact with the surfaces of the photosensitive drums 51*y*, 51*m*, 51*c*, and 51*k* and are driven to rotate by the rotations the photosensitive drums 51*y*, 51*m*, 51*c*, and 51*k*. The charging rollers 52*y*, 52*m*, 52*c*, and 52*k* uniformly charge the surfaces of the photosensitive drums 51*y*, 51*m*, 51*c*, and 51*k*, respectively.

The developing devices 53*y*, 53*m*, 53*c*, and 53*k* respectively have the developing sleeves 54*y*, 54*m*, 54*c*, and 54*k*. The developing devices 53, 53*m*, 53*c*, and 53*k* respectively accommodate developer supplied from the toner bottles 41*y*, 41*m*, 41*c*, and 41*k*. The developing devices 53*y*, 53*m*, 53*c*, and 53*k* respectively develop with toner the electrostatic latent images formed on the photosensitive drums 51*y*, 51*m*, 51*c*, and 51*k* by developing biases being applied.

The developing sleeves 54*y*, 54*m*, 54*c*, and 54*k* are constituted by non-magnetic material such as aluminum and non-magnetic stainless steel. Aluminum is used in this embodiment as the non-magnetic material of the developing sleeves 54*y*, 54*m*, 54*c*, and 54*k*. Inside the developing sleeves 54*y*, 54*m*, 54*c*, and 54*k*, unshown magnet rollers are fixed in non-rotating state. The developing sleeves 54*y*, 54*m*, 54*c*, and 54*k* bear developer having non-magnetic toner and magnetic carrier and respectively convey the developer to the developing areas of the photosensitive drums 51*y*, 51*m*, 51*c*, and 51*k*.

The toner bottles 41*y*, 41*m*, 41*c*, and 41*k* respectively supply the developer to the developing device 53*y*, 53*m*, 53*c*, and 53*k*.

The exposure devices 42*y*, 42*m*, 42*c*, and 42*k* are laser scanners that expose the photosensitive drums 51*y*, 51*m*, 51*c*, and 51*k* by irradiating with laser beams the surfaces of the photosensitive drums 51*y*, 51*m*, 51*c*, and 51*k* according to the image information of separated colors input from the control portion 90.

The toner images developed on the surfaces of the photosensitive drums 51*y*, 51*m*, 51*c*, and 51*k* are primarily transferred to the intermediate transfer unit 44. The intermediate transfer unit 44 has the driving roller 44*a*, the driven roller 44*d*, the primary transfer rollers 47*y*, 47*m*, 47*c*, and 47*k*, the intermediate transfer belt 44*b*, and the belt cleaning device 56.

The intermediate transfer belt 44*b* is wound around the driving roller 44*a*. The driving roller 44*a* is driven to rotate by an unshown motor, so that the intermediate transfer belt 44*b* is rotated.

The intermediate transfer belt 44*b* is wound around the driven roller 44*d*. The driven roller 44*d* is a tension roller that controls the tension force of the intermediate transfer belt 44*b* to a constant value. The driven roller 44*d* applies an outwardly pushing force to the intermediate transfer belt 44*b* by the urging force of an unshown urging spring.

The primary transfer rollers 47*y*, 47*m*, 47*c*, and 47*k* come in contact with the intermediate transfer belt 44*b* and are respectively disposed opposed to the photosensitive drums 51*y*, 51*m*, 51*c*, and 51*k* via the intermediate transfer belt 44*b*. The primary transfer rollers 47*y*, 47*m*, 47*c*, and 47*k* primarily transfer the toner images on the photosensitive drums 51*y*, 51*m*, 51*c*, and 51*k* to the intermediate transfer belt 44*b*, respectively by the primary transfer biases being applied.

The intermediate transfer belt 44*b* comes into contact with the photosensitive drums 51*y*, 51*m*, 51*c*, and 51*k* and the intermediate transfer belt 44*b* and the photosensitive drums 51*y*, 51*m*, 51*c*, and 51*k* respectively form primary transfer portions. The toner images formed on the photosensitive drums 51*y*, 51*m*, 51*c*, and 51*k* are primarily transferred on the intermediate transfer belt 44*b* in the primary transfer portions, respectively. For example, the toner images with negative polarity on the photosensitive drums 51*y*, 51*m*, 51*c*, and 51*k* are multiply transferred onto the intermediate transfer belt 44*b* in a sequential basis by the primary transfer biases of positive polarity being applied by the primary transfer rollers 47*y*, 47*m*, 47*c*, and 47*k*, respectively. The intermediate transfer belt 44*b* rotates while bearing the toner images that are primarily transferred from the photosensitive drums 51*y*, 51*m*, 51*c*, and 51*k*.

The belt cleaning device 56 cleans the intermediate transfer belt 44*b* by removing the remaining toner on the intermediate transfer belt 44*b* after transfer.

In the secondary transfer portion 45, the toner images primarily transferred on the intermediate transfer belt 44*b* are secondarily transferred on the recording material S fed by an unshown sheet feeding device. Thereafter the recording material S on which the toner images are secondarily transferred is conveyed to the fixing device 20. The secondary transfer portion 45 has the secondary inner roller 45*a* and the secondary transfer outer roller 45*b*.

The secondary transfer outer roller 45*b* is in contact with the intermediate transfer belt 44*b* and a nip portion is formed between the secondary transfer outer roller 45*b* and the intermediate transfer belt 44*b*. The secondary transfer outer roller 45*b* secondarily transfers in a batch the toner images borne by the intermediate transfer belt 44*b* onto the recording material S supplied to the nip portion by the secondary transfer bias having a polarity opposite to that of the toner being applied.

The fixing device 20 is a heating device of belt heating type and is formed as a cartridge to be detachably attachable to the apparatus main body 10. The fixing device 20 fixes the unfixed toner image secondarily transferred onto the recording material S conveyed by the secondary transfer portion 45 to the recording material S. The fixing device 20 discharges the recording material S to which the toner images are fixed to the outside of the apparatus main body 10. The configuration of the fixing device 20 will be described in detail later.

The control portion 90 controls the entire operation of the image forming apparatus 1. The control portion 90 has the CPU (Central Processing Unit) 91, the ROM (Read Only Memory) 92, the RAM (Random Access Memory) 93, and the I/F (Interface) 94.

The CPU 91 is a microprocessor that controls the entire operation of the image forming apparatus 1 by reading out the control program stored in the ROM 92 and by executing it and is the center of the system controller. The CPU 91 controls the operations of the driving motor M1, the operation portion, the sheet feeding portion and the image forming portion 40 by communicating with an unshown operation portion, an unshown sheet feeding portion, and the image forming portion 40 through exchange of signals via I/F 94 using the RAM 93.

A control program and an image forming control sequence for forming an image on a recording material S are stored in the ROM 92 in advance.

The RAM 93 temporarily stores data.

The I/F 94 is an input and output circuit that outputs and inputs a signal to and from outside the control portion 90. The I/F 94 is connected to the operation portion, the sheet feeding portion, and the image forming portion 40.

The driving motor M1 drives the driving members of the fixing device 20 under the control of the CPU 91 of the control portion 90.

Configuration of Fixing Device

The configuration of the fixing device 20 according to the embodiment of the present invention will be described in detail referring to FIGS. 3 to 8.

The fixing device 20 has the housing 21, the fixing frame 23, the guide portion 24, the pressure frame 25, the pressure spring 26, the pressure cam 27, the separating moving lever 28, the separating moving cam 29, the heating unit 30, the sheet discharging unit 60, the sheet discharging unit rotating shaft 81, the sheet discharging unit locking shaft 82, the stopper 83 and the torsion coil spring 84.

The housing 21 is the apparatus main body of the fixing device 20 accommodating respective members of the fixing device 20.

Figure 4:
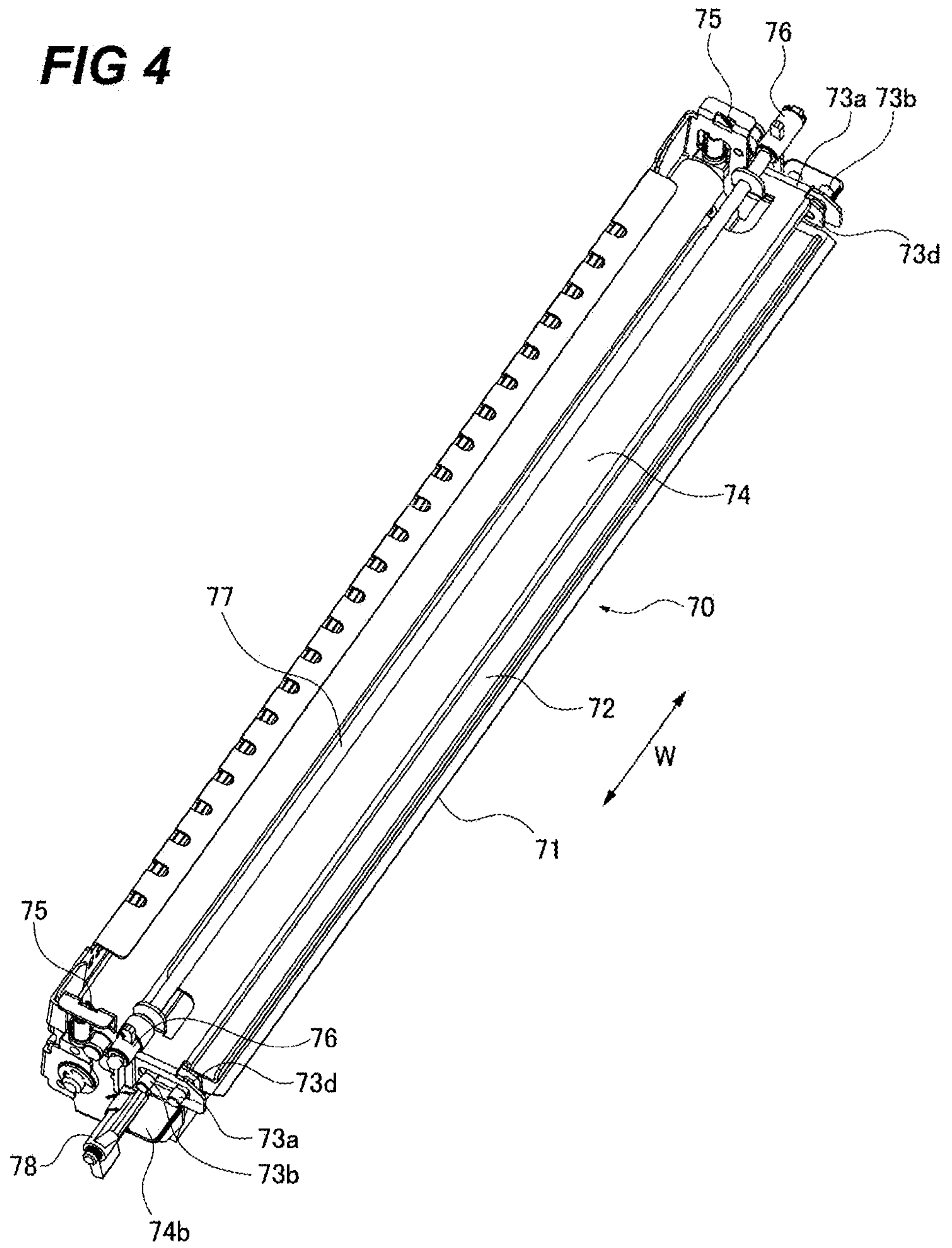
FIG. 4 is a diagram showing a perspective view of a separating unit of the developing device viewed from the above according to the embodiment of the present invention.

The fixing frame 23 is provided to be fixed at both side portions of the housing 21 in the rotational axis direction W indicated in FIG. 4. The rotational axis direction W is a width direction perpendicular to the conveying direction of the recording material S (hereinafter referred to simply as conveying direction) or the direction parallel to the main scanning direction. The guide portion 24, the pressure frame 25, the pressure spring 26, the pressure cam 27, the separating moving lever 28, the separating moving cam 29, the sheet discharging unit rotating shaft 81, the sheet discharging unit locking shaft 82, and the stopper 83 are provided at the fixing frame 23.

The stay 35 of the heating unit 30, which will be describe later, is inserted into the guide portion 24 and the stay 35 is fixed by an unshown fixing means. The guide portion 24 has the supporting portion **24*a*, the positioning portion 24*b*, and the sliding portion 24*c***.

The supporting portion **24*a* is formed along the conveying direction inside the fixing belt 31. The supporting portion 24*a* supports the reactive force the fixing belt 31 receives from the pressure roller 22 via the pressure pad 32 and the stay 35 of the heating unit 30, which will be described later, when the heating unit 30** is located in the mounting position.

The positioning portion **24*b* is formed along the vertical direction at the innermost portion in the inserting direction of the heating unit 30 to the fixing frame 23 of the guide 24 inside the fixing belt 31. The positioning portion 24*b* comes in contact with the heating unit 30, which is located in the mounting position to the fixing frame 23, to position the heating unit 30 with respect to the fixing frame 23**.

The sliding portion **24*c* is provided opposed to the supporting portion 24*a* and is formed along the conveying direction. When the heating unit 30 is inserted or pulled, the sliding portion 24*c* guides the stay 35 such that the stay 35 slides on the sliding portion 24*c***.

The pressure frame 25 has the pressure roller 22. The pressure frame 25 is pressed by the pressure cam 27 and moves to the heating unit 30 side against the urging force of the pressure spring 26. As a result, the pressure roller 22 is pressed to the pressure pad 32 via the fixing belt 31. When the pressure of the pressure cam 27 is released, the pressure frame 25 moves in the direction away from the heating unit 30, so that the pressure of the pressure roller 22 to the pressure pad 32 via the fixing belt 31 is released.

The pressure roller 22 as a pressing rotating member has a shaft, an elastic layer provided on the outer circumference of the shaft, and a release layer provided on the outer circumference of the elastic layer. The shaft is formed using stainless steel. The elastic layer is formed using conductive silicone rubber and has a thickness of 3 mm. The release layer is formed using PFA (Perfluoro alkoxy alkane) as fluororesin and has a thickness of 30 km.

When the pressure frame 25 is pressed by the pressure cam 27, the pressure roller 22 comes in contact with the fixing belt 31 and presses the pressure pad 32 via the fixing belt 31. The pressure roller 22 presses the pressure pad and forms the fixing nip portion N that nips the recording material S and the fixing belt 31 with a first pressure and a second pressure that is lower than the first pressure and to convey it. When the pressure of the pressure frame 25 by the pressure cam 27 is released, the pressure roller 22 is separated from the fixing belt 31 by the urging force of the pressure spring 26.

The pressure roller 22 is axially supported by the fixing frame 23 of the housing 21. A gear is fixed to one end portion of the pressure roller 22 in the rotational axis direction W and via the gear, the pressure roller 22 is connected to the driving motor M1. Driven by the driving motor M1, the pressure roller 22 rotates around the rotating shaft that is parallel with the rotational axis direction W.

The pressure spring 26 urges the pressure frame 25 in the direction away from the heating unit 30.

Driven by an unshown driving source, the pressure cam 27 as a pressing member rotates. With the rotation of the pressure cam 27, the pressure cam 27 moves the pressure frame 25 to the heating unit 30 side against the urging force of the pressure spring 26, or the urging force of the pressure spring 26 moves the pressure frame 25 in the direction away from the heating unit 30. When the pressure cam 27 moves the pressure frame 25 to the heating unit 30 side, the pressure cam 27 sets the pressure at the fixing nip portion N to the first pressure or the second pressure lower than the first pressure in response to the rotation amount.

The separating moving lever 28 presses the retracting lever 78 of the separation unit 70 (which will be described later) of the sheet discharge unit 60 by the urging force of the torsion coil spring 84 and rotates the retracting lever 78 in the direction of arrow D in FIG. 7 while the separating moving lever 28 comes in contact with the stopper 83. The separating moving lever 28 is pressed by the separating moving cam 29 and rotates in the direction of arrow E in FIG. 8 against the urging force of the torsion coil spring 84 so that the pressure to the retracting lever 78 is released and the retracting lever 78 rotates in the direction of arrow F in FIG. 8.

The separating moving cam 29 is provided to be coaxial with the pressure cam 27. When the separating moving cam 29 is driven by an unshown driving source, the separating moving cam 29 is rotated with the pressure cam 27 being interlocked with the rotation movement of the pressure cam 27. When the separating moving cam 29 rotates, the separating moving cam 29 presses the separating moving lever 28 and rotates the separation moving lever 28 in the direction of arrow E in FIG. 8 against the urging force of the torsion coil spring 84. When the separating moving cam 29 further rotates, the pressure to the separating moving lever 28 is released and rotates the separation moving lever 28 in the direction opposite of arrow E in FIG. 8 by the urging force of the torsion coil spring 84.

The heating unit 30 heats the recording material S conveyed by the secondary transfer portion 45. The heating unit 30 has the fixing belt 31, the pressure pad 32, the heating roller 33, the steering roller 34, the stay 35, the unit side plate 36, and the separating positioning portion 37.

The fixing belt 31 as a heating rotating member is a thin, cylindrical, endless, and rotatable belt member and is formed from the materials having the heat conductivity and the heat durability. The fixing belt 31 is driven to rotate by following the rotation of the heating roller 33.

The fixing belt 31, for example, has a three-layer structure consisting of a base layer, an elastic layer provided on the outer circumference of the base layer, and a release layer on the outer circumference of the elastic layer. The base layer is 30 m thick and is formed using polyimide resin (PI). The elastic layer is 300 m thick and is formed using silicone rubber. The release layer is 30 m thick and is formed using PFA (Perfluoro alkoxy alkane) as fluororesin. The fixing belt 31 is stretched by the pressure pad 32, the heating roller 33, and the steering roller 34.

A lubricating sheet or lubricant (not shown) is provided between the fixing belt 31 and the pressure pad 32 so that the fixing belt 31 can slide smoothly on the pressure pad 32. The fixing belt 31 comes in contact with the recording material S on which an unfixed toner image is formed and heats the recording material S. The fixing belt 31 is heated by the heating roller 33 based on the detection result of the temperature by a thermistor (not shown) so that the temperature of the fixing belt 31 is controlled to a predetermined target temperature in response to kinds of the recording materials S.

The pressure pad 32 as a nip portion forming member is formed from the liquid crystal polymer (LCP). The pressure pad 32 is supported by the stay 35 and the pressure pad 32 is pressed to the pressure roller 22 via the fixing belt 31 by the stay 35 to form the fixing nip portion N. The pressure pad 32 has the curved portion 32*a* (see FIG. 6) at the downstream end portion in the conveying direction at the fixing nip portion N for separating the recording material S from the fixing belt 31 by curving the fixing belt 31. The pressure pad 32 has a crown shape in which the center portion of the pressure pad 32 is more convex in the conveying direction than the end portions in the rotational axis direction W.

The heating roller 33 is a stainless steel pipe with a thickness of 1 mm. A halogen heater (not shown) is provided inside the heating roller 33 so that the heating roller 33 can be heated to a predetermined temperature. A gear (not shown) is fixed to one end of the heating roller 33 in the rotational axis direction W. The heating roller 33 is connected to the driving motor M1 via this gear. The heating roller 33 is driven to rotate around the rotating shaft parallel with the rotational axis direction W by the driving motor M1.

The steering roller 34 has a rocking center in the vicinity of one end portion or a center portion in the rotational axis direction W and the steering roller 34 can rock around the rocking center in the substantially vertical direction. The steering roller 34 generates a tension difference of the fixing belt 31 in the rotational axis direction W by rotating around the rotating shaft parallel to the rotational axis direction W to adjust the position of the fixing belt 31 in the rotational axis direction W. The steering roller 34 is a tension roller urged by an urging spring (not shown) supported by a frame (not shown) of the heating unit 30. The steering roller 34 is urged in the direction in which a predetermined stretching force is applied to the fixing belt 31.

The stay 35 is formed of stainless steel. Both end portions of the stay 35 in the rotational axis direction W are supported by the fixing frame 23 of the housing 21.

The fixing belt 31, the pressure pad 32, the heating roller 33, the steering roller 34, and the stay 35 are attached to the unit side plate 36 to form a cartridge.

The separating positioning portion 37 is provide at the stary 35. The guide groove 37*b* is formed in the separating positioning portion 37 from the tip portion in the conveying direction along the direction opposite from the conveying direction. The separating positioning portion 37 positions the separating plate 71 of the separating unit 70 (described later) of the sheet discharging unit 60. The separating positioning portion 37 guides with the guide groove 37*b* the movements of the separating plate 71, the separating plate supporting member 72, and the separating plate restricting portion 73 (described later) of the separating unit 70 in the conveying direction or the direction opposite the conveying direction, and restricts their movements to the direction opposite the conveying direction.

The sheet discharging unit 60 is provided downstream of the fixing nip portion N in the conveying direction, and discharges the recording material S having passed through the fixing nip portion N outside the fixing device 20. The sheet discharging unit 60 is rotatable around the sheet discharge unit rotating shaft 81 of the fixing frame 23. In the case where the recording material S is jammed at the exit of the fixing nip portion N, when the sheet discharging unit 60 is rotated in the arrow A in FIG. 3, the recording material S jammed can be removed by exposing the fixing nip portion N. The sheet discharging unit 60 has the sheet discharging lower guide 61, the discharge roller pair 62, the sheet discharging unit locking member 63, and the separating unit 70.

The sheet discharging lower guide 61 is a lower side guide in a conveying path for the recording material S conveyed from the fixing nip portion N to the discharge roller pair 62.

The discharge roller pair 62 is disposed in the position about 40 mm downstream of the fixing nip portion N in the conveying direction. The discharge roller pair 62 discharges the recording material S separated by the separating unit 70 outside the fixing device 20.

The sheet discharging unit locking member 63 engages with the sheet discharging unit locking shaft 82 of the fixing frame 23 and positions the sheet discharging unit 60 with respect to the fixing frame 23.

The separating unit 70 separates the recording material S from the fixing belt 31 and guides the conveyance of the recording material S separated from the fixing belt 31 to the discharge roller pair 62. The details of the configuration of the separating unit 70 will be described later.

The sheet discharging unit rotating shaft 81 supports the sheet discharging unit 60 such that the sheet discharging unit 60 is rotatable.

When the sheet discharging unit locking member 63 (described later) of the sheet discharging unit 60 engages with the sheet discharging unit locking shaft 82, the sheet discharging unit locking shaft 82 positions the sheet discharging unit 60 with respect to the fixing frame 23.

Figure 8:
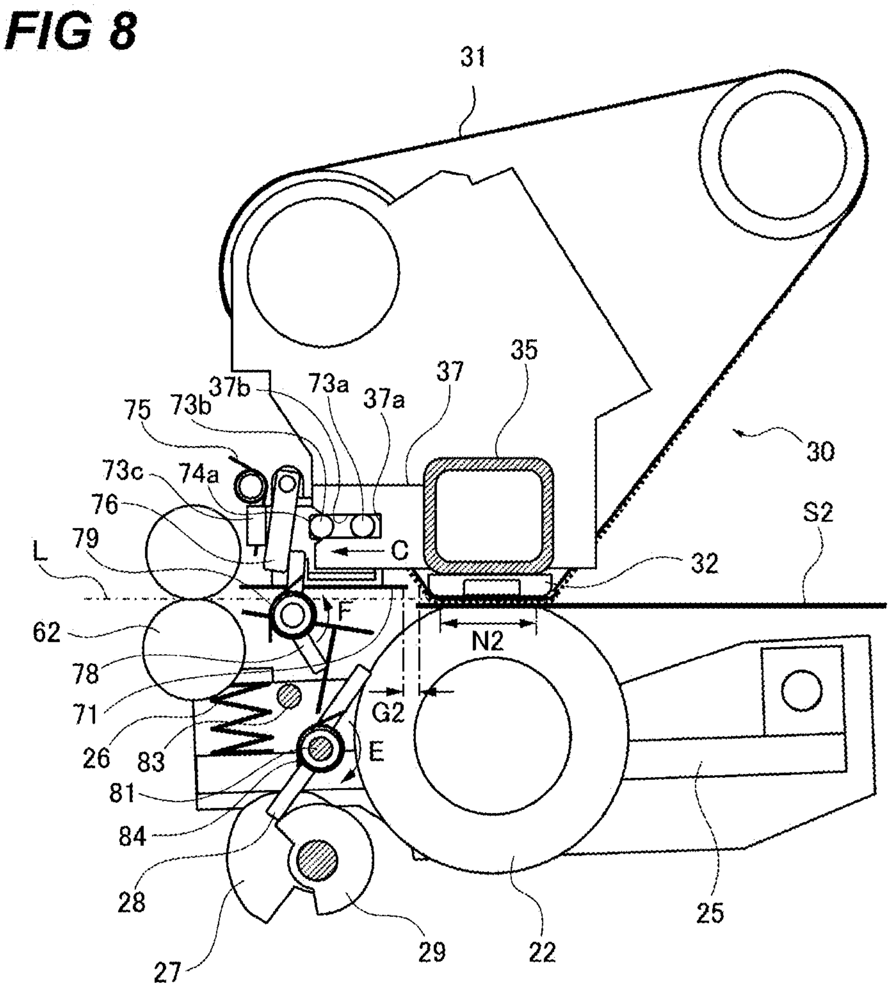
FIG. 8 is a schematic diagram showing the developing device according to the embodiment of the present invention in the state where the fixing belt and the pressure roller abuts against each other at a reduced abutting pressure as compared with the normal abutting pressure.

When the separating moving lever 28 comes in contact with the stopper 83, the stopper 83 restricts the rotation of the separating moving lever 28 in the direction opposite the direction of arrow E in FIG. 8.

Figure 3:
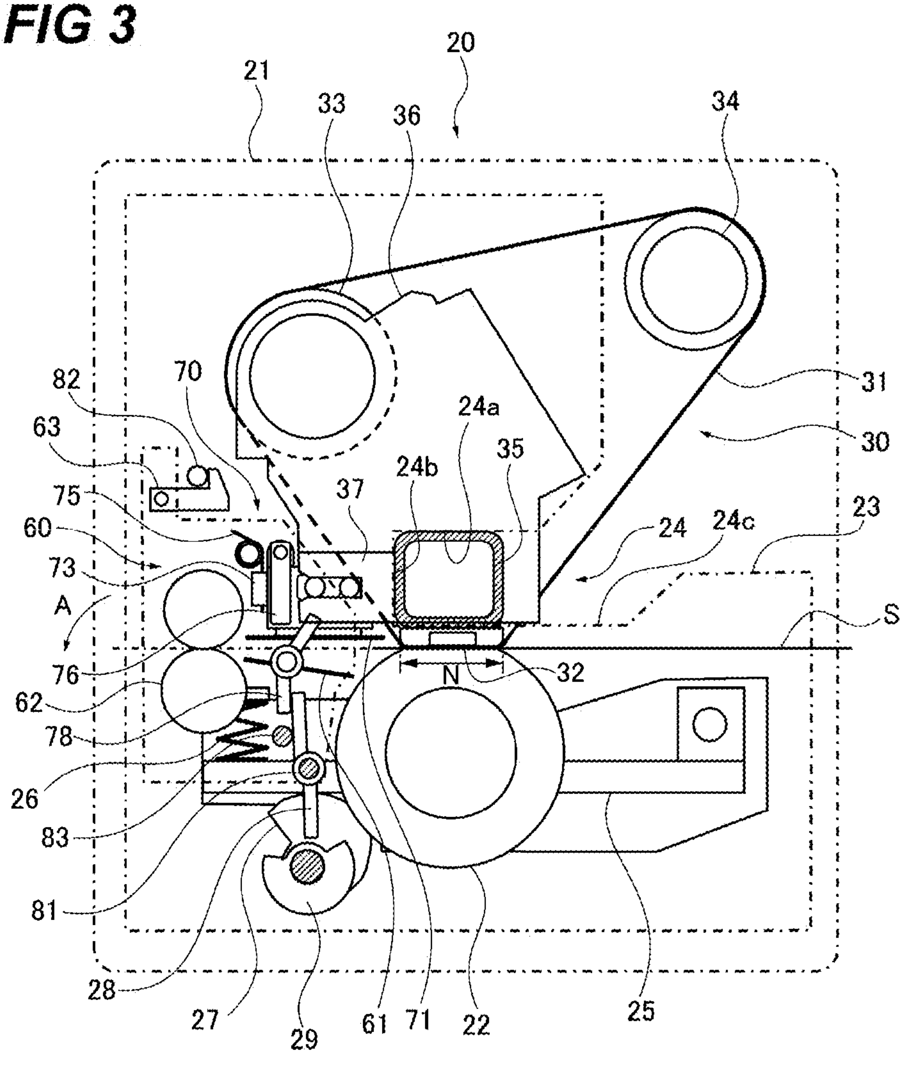
FIG. 3 is a schematic diagram showing the configuration of a developing device according to the embodiment of the present invention.
Figure 6:
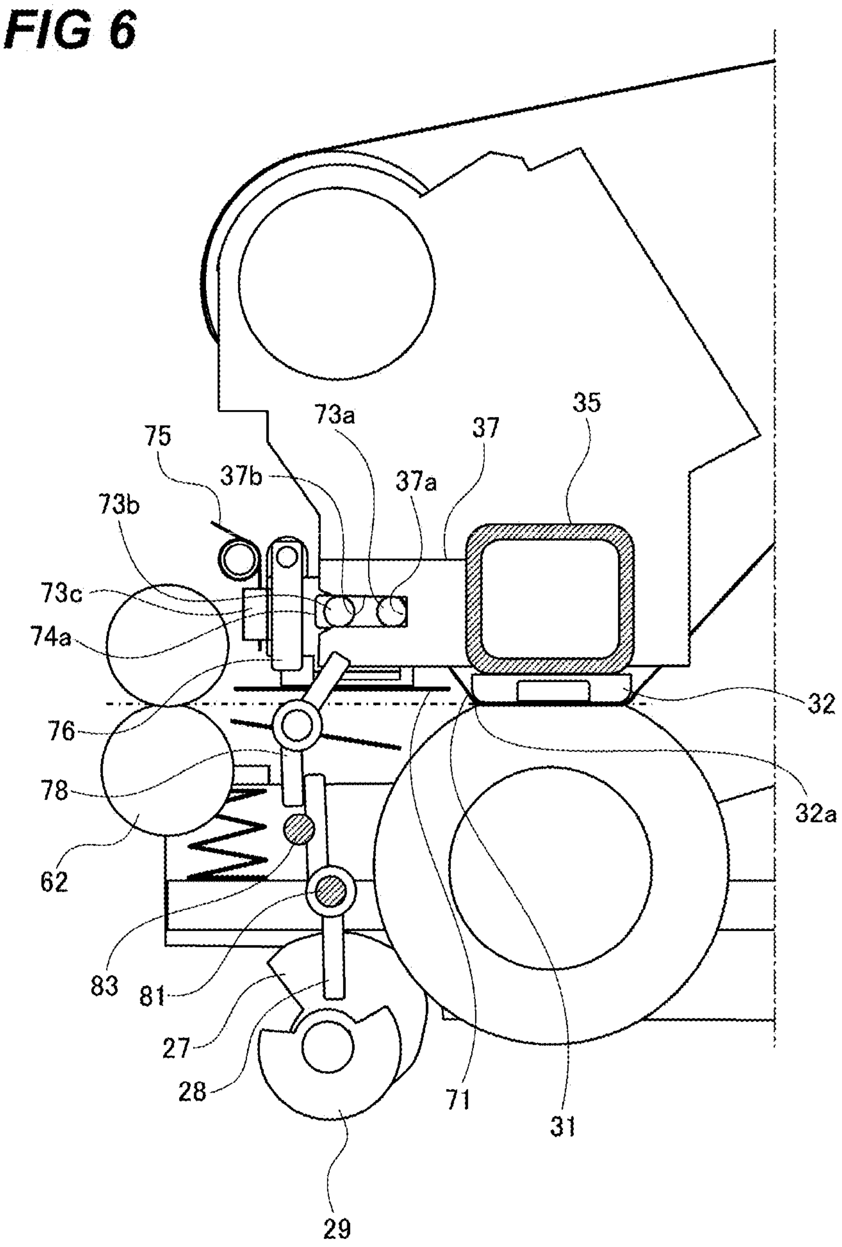
FIG. 6 is a schematic diagram showing a part of the developing device according to the embodiment of the present invention.

The torsion coil spring 84 urges the separating moving lever 28 to the direction in which the separating moving lever 28 comes into contact with the stopper 83. In FIGS. 3 and 6, the depiction of the torsion coil spring 84 is omitted.

The recording material S is heated while being nipped and conveyed in the conveying direction at the fixing nip portion N formed by the pressure roller 22 being in contact with the fixing belt 31 in the fixing device 20 having the configuration described above. As a result, the unfixed toner image formed in the image forming portion 40 and transferred to the recording material S is fixed to the recording material S by being heated and pressed at the fixing nip portion N.

As described above, the fixing device 20 has to have the function of applying heat and pressure, as well as the function of conveying the recording material S.

Configuration of Separating Unit

The configuration of the separating unit 70 of the fixing unit 20 according to the embodiment of the present invention will be described in detail referring to FIGS. 3 to 8.

The separating unit 70 has the separating plate 71, the separating plate supporting member 72, the separating plate regulating portion 73, the separating guide 74, the coil spring 75, the retracting arm 76, the retracting arm shaft 77, the retracting lever 78, and the torsion coil spring 79.

Figure 7:
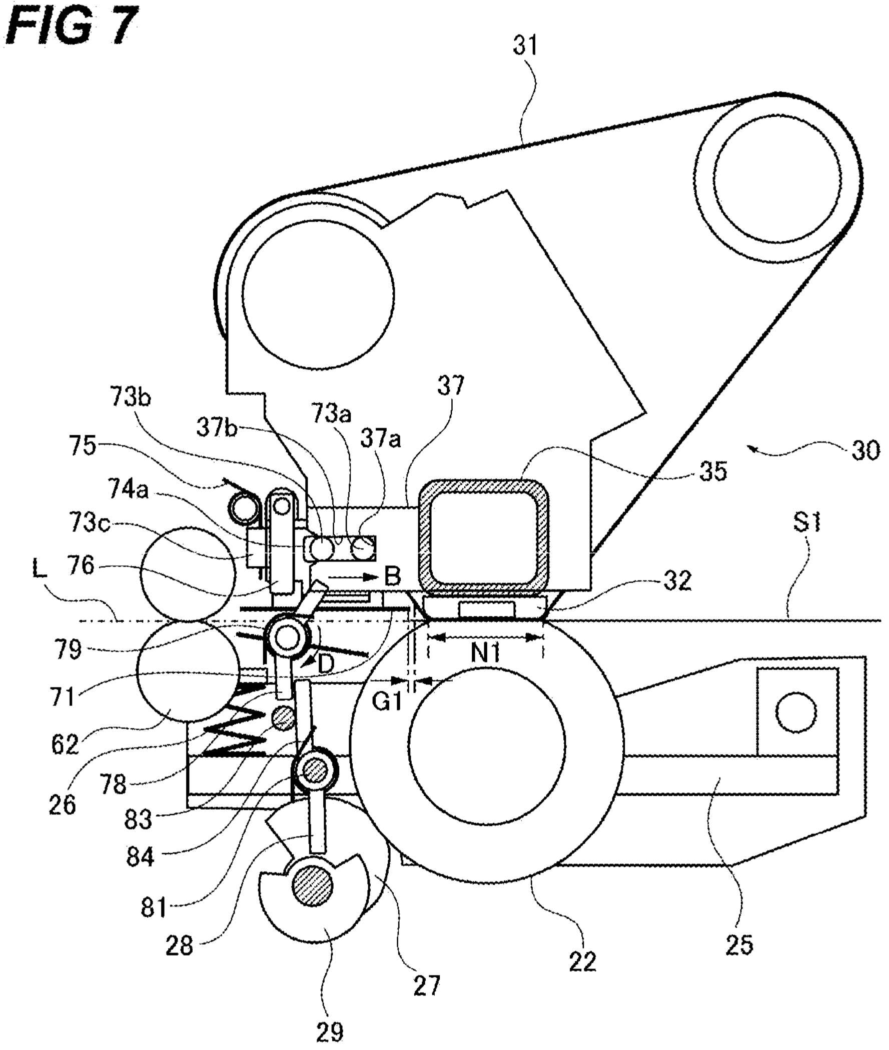
FIG. 7 is a schematic diagram showing the developing device according to the embodiment of the present invention in the state where a fixing belt and a pressure roller abuts against each other at a normal abutting pressure.

The separating plate 71 as a separating member is a metal plate that is slidable in the conveying direction of arrow C in FIG. 8 and in the direction opposite the conveying direction of arrow B in FIG. 7. A fluorine-based tape is attached to the surface of the separating plate 71 to prevent the toner from being attached to the surface from the recording material S by sliding and to prevent the image formed on the recording material S from being damaged. The separating plate 71 is disposed to face the fixing belt 31 with a distance such that the separating plate 71 is not in contact with the fixing belt 31 to separate, from the fixing belt 31, the recording material S having passed through the fixing nip portion N.

The separating plate 71 and the separating plate restricting portions 73 are provided on the separating plate supporting member 72.

The two separating plate regulating portions 73 are respectively disposed on both side portions in the rotational axis direction W and are supported along with the separating plate supporting member 72 by the separating positioning portion 37 and the separating guide 74 to be able to relatively move. The separating plate supporting member 72 and the separating plate regulating portions 73 constitute a positioning member that can be moved with the separating plate 71. Each of the separating plate regulating portions 73 has the first guide shaft 73*a*, the second guide shaft 73*b*, the spring hook portion 73*c*, and the side surface portion 73*d*.

The first guide shaft 73*a* is provided such that the first guide shaft 73*a* outwardly protrudes from the side surface portion 73*d* and the center of the rotational axis of the first guide shaft 73*a* corresponds to the rotational axis direction W. The first guide shaft 73*a* slidably engages with the guide groove 37*b* of the separating positioning portion 37 and the guide groove 74*a* of the separating guide 74. The first guide shaft 73*a* comes in contact with the contact portion 37*a* that is the inner wall of the end portion of the guide groove 37*b* in the direction opposite the conveying direction by the urging force of the coil spring 75.

The second guide shaft 73*b* is provided such that the second guide shaft 73*b* outwardly protrudes from the side surface portion 73*d* and the center of the rotational axis of the second guide shaft 73*b* corresponds to the rotational axis direction W. The second guide shaft 73*b* slidably engages with the guide groove 37*b* of the separating positioning portion 37. When the second guide shaft 73*b* engages with the guide groove 37*b*, the second guide shaft 73*b* stops the rotation of the separating positioning portion 37. The second guide shaft 73*b* comes in contact with the inner wall of the end portion of the guide groove 74*a* of the separating guide 74 in the conveying direction.

The first guide shaft 73*a* and the second guide shaft 73*b* are provided on the side surface portion 73*d* with a distance between the first guide shaft 73*a* and the second guide shaft 73*b* along the conveying direction.

The spring hook portion 73*c* supports an end of the coil spring 75.

The side surface portion 73*d* is provided on each end portion of the separating plate supporting member 72 in the rotational axis direction W along a substantially vertical direction.

The separating guide 74 movably supports the separating plate supporting member 72. The separating guide 74 guides and restricts the movements of the separating plate 71, the separating plate supporting member 72, the separating plate regulating portion 73. The separating guide 74 has the guide groove 74*a*, the fastening portion 74*b*.

The guide groove 74*a* is an oval through-hole that penetrates through the separating guide 74 in the plate width direction. The guide groove 74*a* guides the movements of the separating plate 71, the separating plate supporting member 72, the separating plate restricting portion 73 in the conveying direction or the direction opposite the conveying direction by slidably engaging with the first guide shaft 73*a* and the second guide shaft 73*b*. The guide groove 74*a* restricts the movements of the separating plate 71, the separating plate supporting member 72, the separating plate restricting portion 73 in the conveying direction by the second guide shaft 73*b* coming into contact with the inner wall of the end portion of the guide groove 74*a* in the conveying direction.

The fastening portion 74*b* is fastened to the housing of the sheet discharging unit 60.

Figure 5:
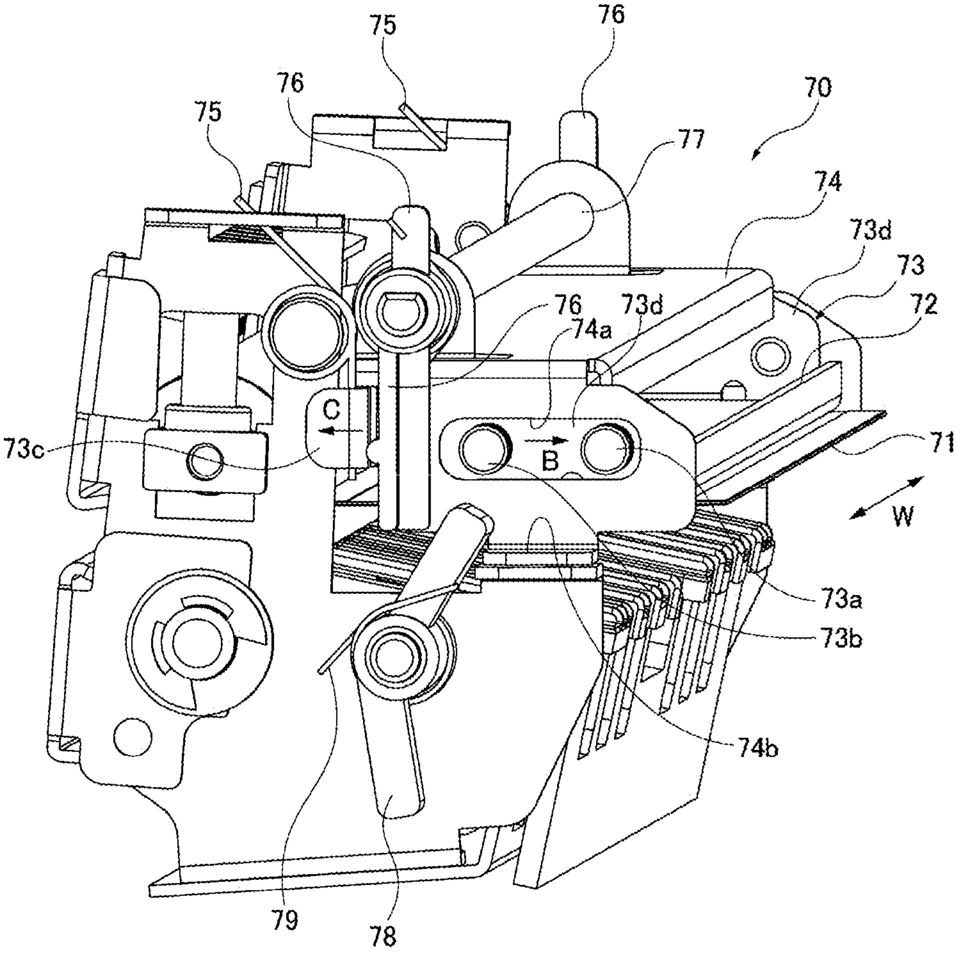
FIG. 5 is a diagram showing a perspective view of the separating unit of the fixing device viewed from the upstream side in the conveying direction of a recording material.

The coil spring 75 is a torsion coil spring that urges the separating plate restricting portion 73 in the direction of arrow B in FIGS. 5 and 7. By the coil spring 75 urging the separating plate restricting portion 73 in the direction of arrow B, the first guide shaft 73*a* comes into contact with the contact portion 37*a* of the separating positioning portion 37.

The retracting arm 76 is provided on the both end portions of the separating guide 74 in the rotational axis direction W and fixed to the retracting arm shaft 77. The retracting arm 76 is pressed by the retracting lever 78 and rotated with the retracting arm shaft 77 in the clockwise direction in FIG. 8. As a result, the separating plate restricting portion 73 moves in the direction of arrow C in FIGS. 5 and 7 against the urging force of the coil spring 75. When the pressure by the retracting lever 78 is released, the retracting arm 76 rotates with the retracting arm shaft 77 in the counter-clockwise direction in FIG. 8. As a result, the separating plate restricting portion 73 moves in the direction of arrow B in FIGS. 5 and 7 by the urging force of the coil spring 75.

The retracting arm shaft 77 is rotatably supported by the separating guide 74.

The retracting lever 78 is rotatably supported by the housing of the sheet discharging unit 60. When the retracting lever 78 is pressed by the separating moving lever 28 and rotates in the direction of arrow D in FIG. 7 against the urging force of the torsion coil spring 79, the pressure on the retracting arm 76 is released. When the pressure of the separating moving lever 28 is released, the retracting lever 78 rotates in the direction of arrow F in FIG. 8 by the urging force of the torsion coil spring 79. As a result, the retracting arm 76 rotates in the clockwise direction in FIG. 8.

The torsion coil spring 79 urges the retracting lever 78 in the direction of arrow F in FIG. 8. The depiction of torsion coil spring 79 is omitted in FIGS. 3 and 6.

Image Forming Operation of Image Forming Apparatus

The image forming operation of the image forming apparatus 1 according to the embodiment of the present invention will be described in detail referring to FIGS. 1 and 2.

The image forming apparatus 1 starts the image forming operation when an image signal is input from a document reading apparatus, a host device, or an external device.

When the image forming apparatus 1 starts the image forming operation, the photosensitive drums 51*y*, 51*m*, 51*c*, and 51*k* are rotated and the surfaces of the photosensitive drums 51*y*, 51*m*, 51*c*, and 51*k* are respectively charged by the charging rollers 52*y*, 52*m*, 52*c*, and 52*k*.

Next, in the image forming apparatus 1, the photosensitive drums 51*y*, 51*m*, 51*c*, and 51*k* are respectively irradiated with a laser beam by the exposure devices 42*y*, 42*m*, 42*c*, and 42*k* based on the image information to form an electrostatic latent image on the photosensitive drums 51*y*, 51*m*, 51*c*, and 51*k*.

Next, in the image forming apparatus 1, the toner supplied by the developing devices 53*y*, 53*m*, 53*c*, and 53*k* are attached to electrostatic latent images formed on the photosensitive drums 51*y*, 51*m*, 51*c*, and 51*k*. When the toner is attached to the electrostatic latent images, the electrostatic latent images are visualized and toner images are formed on the surfaces of the photosensitive drums 51*y*, 51*m*, 51*c*, and 51*k*.

Next, the toner images formed on the surfaces of the photosensitive drums 51*y*, 51*m*, 51*c*, and 51*k* are sequentially transferred on the intermediate transfer belt 44*b* of the image forming apparatus 1.

In parallel with the above operation, the recording material S is conveyed to the secondary transfer portion 45 of the image forming apparatus 1 in synchronism with the conveying timing of the toner images on the intermediate transfer belt 44*b*.

Next, the toner images that have been transferred to the intermediate transfer belt 44*b* are transferred to the recording material S at the second transfer portion 45 of the image forming apparatus 1.

Next, the unfixed toner image that has been transferred to the recording material S is heated and pressed by the fixing device 20 so that the unfixed toner image is fixed to the recording material S.

The recording material S on which the toner image is fixed is discharged outside the apparatus main body 10 of the image forming apparatus 1.

Operation of Fixing Device

The operation of the fixing device 20 according to the embodiment of the present invention will be described in detail.

Figure 9:
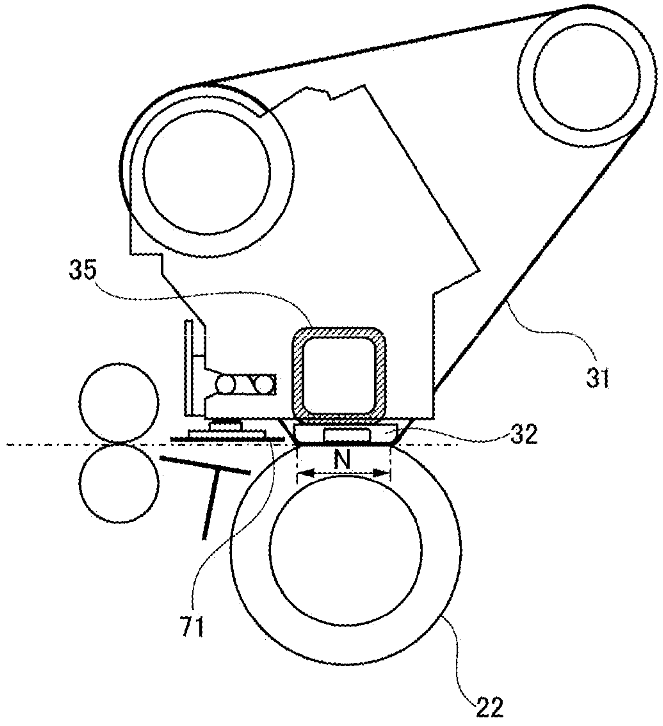
FIG. 9 is a schematic diagram for describing the positional relationship between the fixing belt and the abutting member of the fixing device according to the embodiment of the present invention.
Figure 10A:
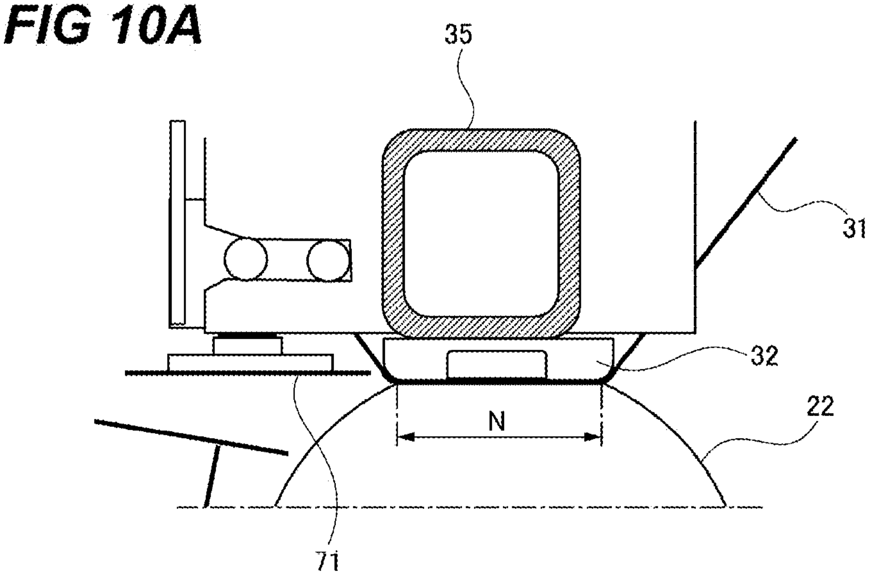
FIGS. 10A and 10B are an enlarged schematic diagram for describing the positional relationship between the fixing belt and the abutting member of the fixing device according to the embodiment of the present invention.
Figure 10B:
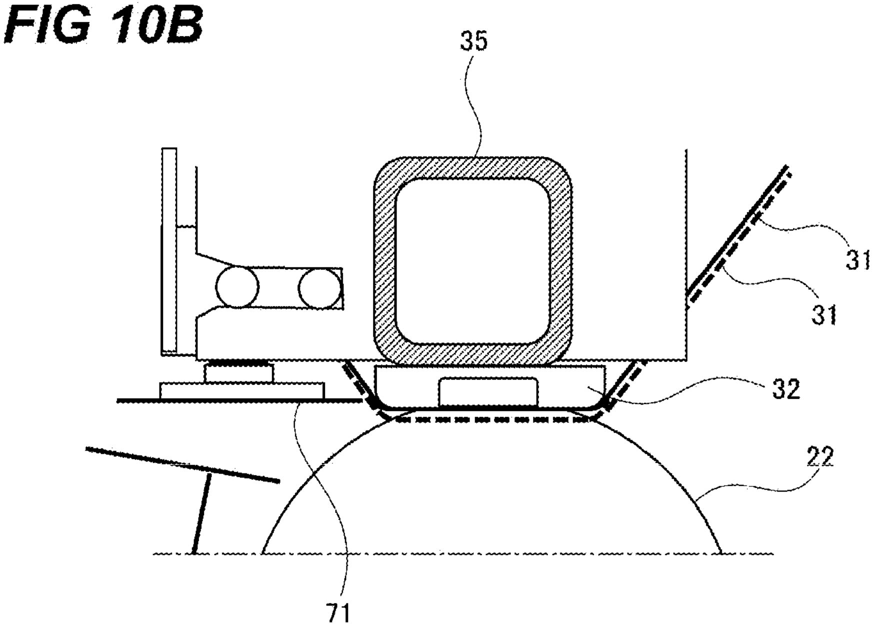

First, the positional relationship between the fixing belt 31 and the separating plate 71 in the case where the contact pressure between fixing belt 31 and the pressure roller 22 can be changed will be described referring to FIGS. 9 and 10. In FIGS. 9 and 10, the depiction of a part of the fixing device 20 is omitted.

The pressure of the fixing nip portion N is reduced to the second pressure, which is about a half of the first pressure. Therefore, the deflection amount of the central portion in the rotational axis direction W of the stay 35 holding the pressure pad 32 becomes small. As a result, the central portion of the fixing belt 31 in the rotational axis direction W in the case where the pressure of the fixing nip portion N becomes the second pressure moves in the direction in which the central portion comes closer to the separating plate 71. Accordingly, it is necessary to move the separating plate 71 to the direction in which the separating plate 71 goes away from the fixing belt 31 when the pressure of the fixing nip portion N is the second pressure.

The operation of the fixing device 20 taking into consideration the above positional relationship will be described in detail referring to FIGS. 3 to 8. First, the operation of the fixing device 20 in the normal pressure state in which the pressure of the fixing nip portion N is the first pressure will be described referring to FIG. 7. The fixing nip portion N in this case will be indicated as the fixing nip portion N1.

The pressure frame 25 is pressed by the pressure cam 27 that is driven to rotate by a driving source (not shown) and is moved to the side of the heating unit 30. As a result, the pressure roller 22 is pressed to the pressure pad 32 via the fixing belt 31 so that the fixing nip portion N1 is formed. By adjusting the contact pressure of the pressure roller 22 by the pressure pad 32 having a crown shape, the entire region of the fixing nip portion N1 of the fixing device 20 in the rotational axis direction W is substantially flat.

The separating moving lever 28 is in the state in which the separating moving lever 28 is in contact with the stopper 83 provided on the fixing frame 23 by the urging force of the torsion coil spring 84. As a result, the retracting lever 78 is pressed by the separating moving lever 28 and rotates in the direction of arrow D. Further, the separating plate restricting portion 73 is in the state in which the separating plate restricting portion 73 has moved in the direction of arrow B by the urging force of the torsion coil spring 75 and the first guide shaft 73*a* is in contact with the contact portion 37*a* of the separating positioning portion 37.

In this state, the fixing belt 31 and the separating plate 71 are positioned and the gap G1 is obtained between the fixing belt 31 and the separating plate 71. Because the entire region of the fixing nip portion N1 in the rotational axis direction W is substantially flat, the length of about 500 μm of the gap G1 can be guaranteed across the entire region of fixing nip portion N1 in the rotational axis direction W. As a result, in the fixing device 20, various types of recording materials S separated from the fixing belt 31 are guided from the exit of the fixing nip portion N1 to the discharge roller pair 62 without being got jammed in the gap G1 between the fixing belt 31 the separating plate 71.

Next, the operation of the fixing device 20 in the reduced pressure state in which the pressure of the fixing nip portion N is the second pressure for fixing unfixed toner image on the recording material S such as an envelop will be described referring to FIG. 8. The fixing nip portion N in this case will be indicated as the fixing nip portion N2.

The pressure frame 25 is pressed by the pressure cam 27 that is driven to rotate by a driving source (not shown) and is moved to the heating unit 30 side. As a result, the pressure roller 22 is pressed to the pressure pad 32 via the fixing belt 31 to form the fixing nip portion N2.

In order to suppress the degradation of the fixing member of the fixing device 20 due to the wrinkles and the edges of the envelop, the pressure of the fixing nip portion N2 is reduced to the second pressure that is about the half of the first pressure. As a result, the deflection amount at the central portion of the pressure pad 32 in the rotational axis direction W becomes smaller that that in the case where the pressure of the fixing nip portion N2 is the first pressure. The traveling locus of the fixing belt 31 moves to the more downstream side in the conveying direction as compared with the case where the pressure of the fixing nip portion N2 is the first pressure because the nip position at the central portion of the fixing belt 31 at the fixing nip portion N2 in the rotational axis direction W moves downward as shown by the dotted line in FIG. 8.

Further, the separating moving lever 28 is pressed by the separating moving cam 29 that is provided coaxially with the pressure cam 27 and is rotated in the direction of arrow E. As a result, the retracting lever 78 is rotated in the direction of arrow F by the urging force of the torsion coil spring 79.

According to this movement, the retracting arm 76 is pressed by the retracting lever 78 and is rotated clockwise in FIG. 8 against the urging force of the torsion coil spring 75 so that the separating plate restricting portion 73 is moved in the direction of arrow C. When the separating plate restricting portion 73 is moved in the direction of arrow C, the first guide shaft 73*a* and the second guide shaft 73*b* are moved to the direction of arrow C with the first guide shaft 73*a* and the second guide shaft 73*b* engaging with the guide groove 37*b*, so that the first guide shaft 73*a* retracts from the contact portion 37*a*. The distance between the first guide shaft 73*a* and the contact portion 37*a* is exemplified as 1000 μm.

When the separating plate restricting portion 73 moves in the direction of arrow C, the separating plate 71 moves in the direction of arrow C that is the direction toward the downstream side in the conveying direction. As described above, the separating plate 71 is moved interlocked with the pressing operation of the pressure cam 27 to the pressure frame 25.

In this state, the fixing belt 31 and the separating plate 71 are positioned and the gap G2 exists between the fixing belt 31 and the separating plate 71. The gap G2 of a length 500 μm can be guaranteed at the central portion of the fixing nip portion N2 in the rotational axis direction W whereas the gap G2 of a length 1000 μm can be guaranteed at the both end portions of the fixing nip portion N2 in the rotational axis direction W.

By the separating positioning portion 37 and the guide groove 74*a*, the separating plate 71 moves in the region of the fixing belt 31 side from the nip line L as a discharging locus of the recording material S discharged from the fixing nip portion N (the upper region from the nip line L in FIG. 7). As a result, the separating plate 71 does not enter the discharging locus of the recording material S discharged from the exit of the fixing nip portion N2, so that the recording material S discharged from the exit of the fixing nip portion N2 can be conveyed to the discharge roller pair 62 without being caught by the separating plate 71.

As described above, the separating positioning portion 37 and the separating guide 74 movably hold the separating plate supporting member 72 and the separating plate restricting portion 73. Further, the separating positioning portion 37 and the separating guide 74 set the position of the separating plate 71 with respect to the fixing belt 31 by restricting the movements of the separating plate supporting member 72 and the separating plate restricting portion 73. The separating positioning portion 37 and the separating guide 74 constitute a restricting member.

As described above, even when the pressure of the fixing nip portion N2 shown in FIG. 8 is the second pressure that is the reduced pressure, a contact between the fixing belt 31 and the separating plate 71 can be avoided by guaranteeing that the gas G2 between the fixing belt 31 and the separating plate 71 is in the range of 500 to 1000 μm. Further, in this case, the recording material S separated from the fixing belt 31 can be guided from the exit of the fixing nip portion N2 to the discharge roller pair 62 without being jammed at the gap G2. The length of the gap G2 is configured to be equal to or larger than that of the gap G2. This is because it is easier for the recording material S nipped and conveyed by the first pressure to be separated by curvature than the recording material S (such as an envelope) nipped and conveyed by the second pressure, so that the separating plate 71 functions properly even if the gap G2 is larger than the gap G1.

In the fixing device 20, when the traveling locus changes between in the normal pressure state and in reduced the pressure state, the position of the separating plate 71 with respect to the fixing belt 31 is changed in response to the pressure of the fixing nip portion N. With this configuration, a preferable gap between the fixing belt 31 and the separating plate 71 can be guaranteed for various kinds of recording materials S, so that the fixing device 20 can deal with the various kinds of recording materials S. Further, a higher durability of the fixing belt 31 can be realized by the fixing belt 31 being not in contact with the separating plate 71.

Further, by positioning the separating plate 71 to the fixing belt 31 by the separating plate supporting member 72 and the separating plate restricting portion 73, the separating plate 71 can be positioned to the fixing belt 31 in the non-contact state.

In the present embodiment, the pressure roller 22 is provided that comes in contact with the fixing belt 31 and forms the fixing nip portion N that nips and conveys the recording material S by the first pressure and the second pressure that is lower than the first pressure. Further, the separating plate 71 is provided downstream of the fixing nip portion N in the conveying direction of the recording material S to be opposed to the fixing belt 31 with a gap in the non-contact state. The separating plate 71 separates the recording material S having passed through the fixing nip portion N from the fixing belt 31. When the pressure of the fixing nip portion N is the second pressure, the separating plate 71 moves more downstream in the conveying direction than when the pressure of the fixing nip portion N is the first pressure.

With this configuration, a higher durability of the fixing belt 31 can be realized, a problem that the various kinds of recording materials S cannot be discharged can be avoided, and a preferred gap between the fixing belt 31 and the separating plate 71 can be guaranteed.

The present invention is not limited to the above embodiment and various modifications can be made without departing from the gist of the present invention.

Specifically, in the above embodiment, the coil spring 75 and the torsion coil spring 79 are used. However, the present invention is not limited to these components and another urging means such as a tension spring and a compression spring can be used.

Further, in the above embodiment, the coil spring 75 and the torsion coil spring 79 are provided in the separating unit 70. However, the present invention is not limited to this configuration and the coil spring 75 and the torsion coil spring 79 can be provided outside the separating unit 70 such as in the fixing frame 23.

Furthermore, in the above embodiment, the movement of the separating plate 71 is guided by the first guide shaft 73*a* and the second guide shaft 73*b* slidably engage with the guide groove 37*b* of the separating positioning portion 37. However, the present invention is not limited to this configuration and the movement of the separating plate 71 can be guided by any configurations.

Moreover, in the above embodiment, the nip portion N is formed by the pressure roller 22 being pressed to the pressure pad 32 via the fixing belt 31. However, the present invention is not limited to this configuration and the fixing nip portion N can be formed by the pressure roller 22 and a heating rotating member such as a heating roller.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-113599, filed Jul. 11, 2023, which is hereby incorporated by reference herein in its entirety.

What is claimed is:

1. A fixing device that fixes an unfixed toner image formed on a recording material onto the recording material, comprising:

a heating rotating member configured to be rotatable endless belt and to heat the unfixed toner image;

a pressing rotating member configured to be rotatable and to form a fixing nip portion by coming in contact with the heating rotating member;

a separating member configured to separate the recording material having passed through the fixing nip portion from the heating rotating member, the separating member being provided downstream of the fixing nip portion in a conveying direction of the recording material to be opposed to an outer surface of the endless belt with a gap in a non-contact state; and a drive mechanism, wherein in response to a rotation of the drive mechanism, the pressing rotating member moves from a first pressure state, in which the pressing rotating member contacts the heating rotating member to form the fixing nip portion that nips and conveys the recording material with a first pressure, to a second pressure state, in which the pressing rotating member contacts the heating rotating member to form the fixing nip portion that nips and conveys the recording material with a second pressure that is lower than the first pressure, wherein the separating member moves, relative to a fixed position of the fixing nip portion, more downstream in the conveying direction when the pressure of the fixing nip portion is the second pressure than when the pressure of the fixing nip portion is the first pressure, and wherein as the pressing rotating member moves from the first pressure state to the second pressure state in response to the rotation of the drive mechanism, the separating member moves downstream in the conveying direction.

2. The fixing device according to claim 1, wherein the separating member moves in a region on a side of the heating rotating member from a discharging locus of the recording material discharged from the fixing nip portion.

3. The fixing device according to claim 1, further comprising:

a nip portion forming member that forms the fixing nip portion, wherein the nip portion forming member has a curved portion at an end portion on a downstream side in the conveying direction in the fixing nip portion, the curved portion is configured to separate the recording material from the endless belt by curving the endless belt, and the nip portion forming member forms the fixing nip portion by pressing the pressing rotating member via the endless belt inside the endless belt.

4. The fixing device according to claim 1, further comprising:

a pressing member that presses the pressing rotating member to the heating rotating member to form the fixing nip portion of the first pressure or the second pressure, wherein the separating member moves interlocked with a pressing operation of the pressing member.

5. The fixing device according to claim 1, further comprising:

a positioning member configured to be able to move together with the separating member, and a restricting member configured to movably hold the positioning member and to set a position of the separating member with respect to the heating rotating member by restricting a movement of the positioning member.

6. An image forming apparatus comprising:

the fixing device according to claim 1, and a toner image forming portion configured to form an unfixed toner image on the recording material and to convey the recording material on which the unfixed toner image is formed to the fixing device.

7. The fixing device according to claim 1, wherein the endless belt has a first side and a second side opposite across a thickness of the endless belt from the first side, wherein the pressing rotating member contacts the first side of the heating rotating member to form the fixing nip portion, and wherein the separating member is provided downstream of the fixing nip portion in the conveying direction of the recording material to be opposed to the first side of the heating rotating member with the gap in the non-contact state.

8. The fixing device according to claim 1, wherein when the pressure of the fixing nip portion is the first pressure, the separating member is disposed at a first location such that a first gap exists between the separating member and the heating rotating member, and wherein when the pressure of the fixing nip portion is the second pressure, the separating member is disposed at a second location different from the first location such that a second gap larger than the first gap exists between the separating member and the heating rotating member.

* * * * *